R. E. BRUCKNER.
LIQUID SERVICE GAGE.
APPLICATION FILED OCT. 2, 1919.
1,378,440.
Patented May 17, 1921.
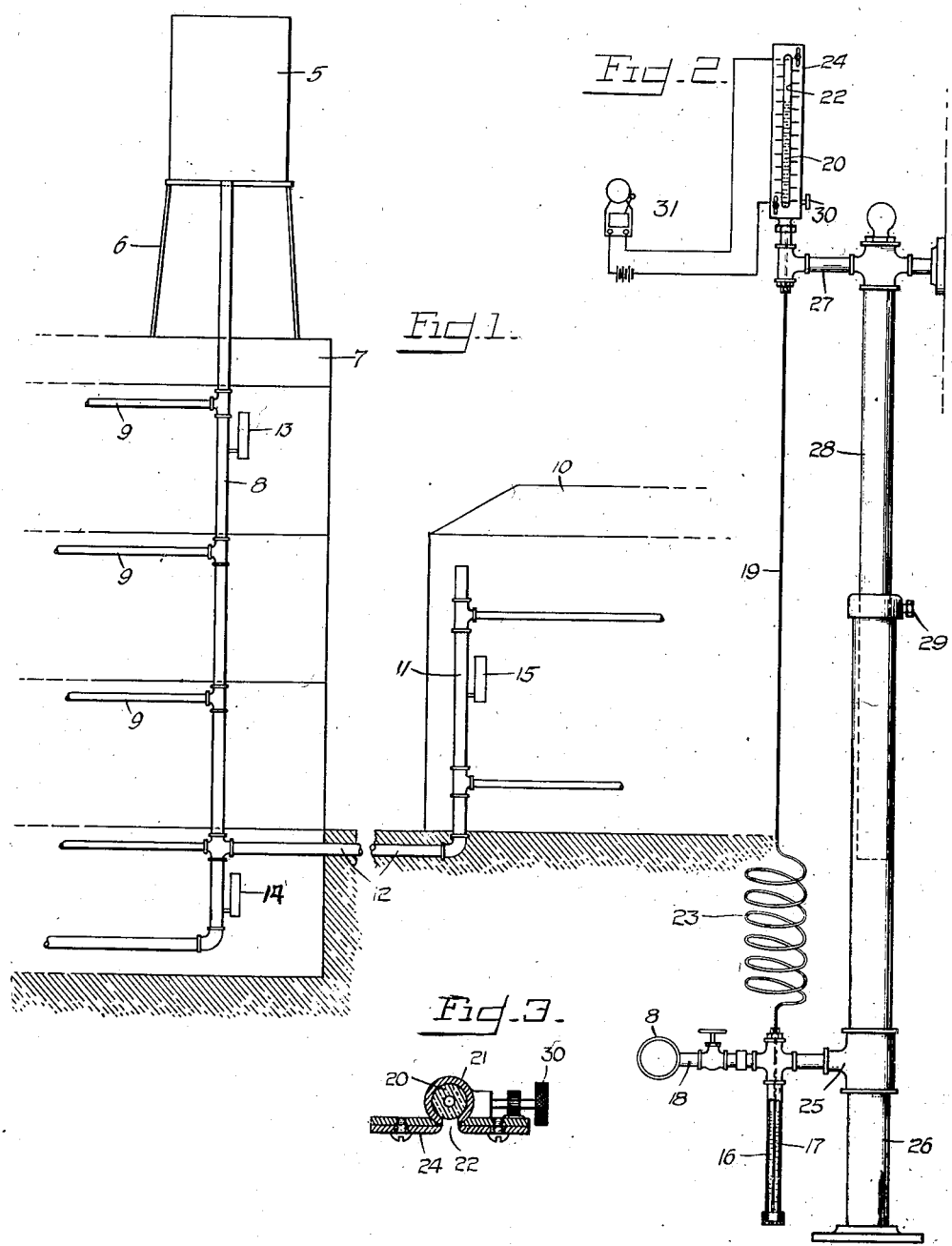

UNITED STATES PATENT OFFICE.

RUDOLPH E. BRUCKNER, OF NEW YORK, N. Y.

LIQUID SERVICE-GAGE.

1,378,440. Specification of Letters Patent. Patented May 17, 1921.

Application filed October 2, 1919. Serial No. 327,930.

*To all whom it may concern:*

Be it known that I, RUDOLPH E. BRUCKNER, a citizen of the United States of America, residing at New York, N. Y., have invented a new and useful Liquid Service-Gage, of which the following is a specification.

My invention relates to apparatus for measuring changes in the level of the liquid in a supply reservoir located at one elevation, and indicating such changes at some other point at a lower level.

I have illustrated the invention as applied to a case where water is stored in an elevated tank for the purpose of supplying water through mains extending to lower levels. In such a case it is desirable to keep the level in the reservoir constant and to enable the superintendent, inspector or other individual to know the depth of water in the reservoir without actually visiting the reservoir itself.

It is my special object to provide a simple form of apparatus which can be installed and utilized at any point in any system below the reservoir irrespective of the height of the reservoir above the ground and irrespective of the depth of the reservoir. I have also sought to provide a device which is accurate at all times and under all circumstances. I have also sought to provide a device which can be installed at any point in the system without the necessity of any connection with the reservoir other than the ordinary delivery mains leading therefrom.

The drawings illustrate one form of apparatus embodying my invention, but it should be understood that the drawing is illustrative only and that the invention may be applied in other ways, and that it may be applied to storage and supply systems for any other liquid.

Figure 1 is a diagrammatic side view and vertical section showing the apparatus installed in a supply system.

Fig. 2 is a side elevation and partial section of one form of gage embodying my invention.

Fig. 3 is a horizontal sectional view taken through the indicating part of the gage.

In Fig. 1, I have shown a supply tank or reservoir 5 mounted on a frame or standard 6 on top of a building 7, which is to be supplied with water through a main 8 and branches 9. I have also shown another building 10 with a riser 11 connected by pipe 12 to the pipe 8.

I have illustrated diagrammatically at 13—14 and 15, gages embodying my invention connected at different points in the system and adapted to indicate at those points the changes in level of the liquid in the tank 5, all of the gages being the same but adjusted to compensate for their different locations.

A receptacle 16 constitutes a well for mercury or other heavy liquid 17. This well is connected by a pipe 18 to one of the delivery or service pipes of the system at the location at which it is desired to indicate the conditions existing in the reservoir. A small tube 19 for carrying a column of mercury is secured in the top of a receptacle 16 and extends down to a point near its bottom. The upper end of the tube 19 is connected to the lower end of a glass tube 20 which is open at the top and provided with a guard 21 having a sight slot 22 through which the height of the mercury column may be observed. The tube 19 which carries the column of mercury is made extensible by means of a coiled portion 23 which allows the tube to be foreshortened or lengthened longitudinally whereby the distance between the glass tube 20 and the receptacle 16 may be substantially varied to meet extreme conditions. 24 is a scale suitably marked to indicate different degrees of change in the height of the mercury column to thereby indicate changes in the level of water in the supply tank 5. For purposes of installation and adjustment the receptacle 16 is carried by a support or bracket 25 which in this instance is on a standard 26 adapted to rest on a shelf or on the floor. The gage glass and scale are carried by a bracket 27 which in this instance is mounted on a post 28 telescopically adjustable in the standard 26. 29 is a clamping member for locking these telescopic parts against movement when the desired adjustment has been effected. The bracket 27 may also be secured to the wall if desired to further steady the gage. For very fine adjustment the scale member 24 may be adjusted up and down relatively to the gage glass 20 by means of an adjusting screw 30 of any suitable type. A platinum point or similar terminal might be embedded in the wall of the gage glass and connected to a recording device or to an alarm signal device 31, to indicate when the level in the tank rises above or falls below the proper limit.

To install the apparatus in a liquid supply system, the mercury reservoir or well is first fixed in position wherever desired and the gage glass is adjusted to its maximum height and fixed temporarily in position. The pipe 18 is then connected between the mercury reservoir and a convenient point in the delivery main and the liquid allowed to slowly enter the reservoir containing the mercury. This forces a column of mercury upward in the tube 19 and through the coil 23 to a height which will depend upon the head of liquid in the system above the mercury reservoir. The supply reservoir or tank at this time should be full or filled to the level which it is desired to establish as a standard for measurements. It will be obvious that the height of the meniscus of the mercury will be in direct proportion to the liquid head in the system above the gage and will depend upon the relative specific gravity of the liquid to be measured and the mercury or other indicating liquid. The gage glass is then slowly lowered until the mercury rises to the mark on the scale indicating "full" or such other standard condition as is determined upon. The gage glass and its bracket 27 are then secured permanently in position. It may then be necessary to slightly readjust the scale with relation to the mercury by means of the adjusting member 30.

It will now be seen that this apparatus will instantly and accurately indicate any change in level of the liquid in the supply tank. It will also be seen that the same instrument may be installed at any elevation in the system and that it is applicable to any system irrespective of the elevation of the supply tank or the depth of the supply tank. The instrument may, therefore, be said to be universal in its application, the necessary adjustments for different conditions being effected very readily by anyone when installing the device. It will also be seen that the device may be installed after the liquid supply system has been installed and without the necessity of installation of additional pipe lines or other connections leading to or from the supply tank.

In using the term mercury I wish it to be understood to include any heavy liquid that can be used for the same purpose in my system.

I claim:

1. A gage for indicating the level of liquid in a supply tank, said gage comprising a receptacle for mercury, means for connecting the receptacle to a pipe leading from said tank, a vertically extensible tube leading upwardly from the interior of said receptacle for carrying a column of mercury, means at the upper end of said tube for permitting the height of said mercury column to be observed, said means and said receptacle being relatively adjustable vertically to permit the distance between the two to be manually varied, and means for fixing said parts against movement after the desired adjustment between them has been effected.

2. A gage having the characteristics set forth in claim 1, the adjustable means between said upper and lower parts of the gage including two spaced bracket supports.

3. A gage having the characteristics set forth in claim 1, the adjustable means between the upper and lower parts of the gage including a telescopic connection adjacent to but separate from the extensible tube.

4. A gage for indicating the level of liquid in a supply tank, said gage comprising a receptacle for mercury, means for connecting said receptacle to a pipe leading from said tank, a vertically extensible tube leading upwardly from the interior of said receptacle for carrying a column of mercury, means at the upper end of said tube for permitting the height of the mercury column therein to be determined, said means being adjustable vertically relatively to said receptacle, whereby the distance between the two may be varied to suit different conditions.

RUDOLPH E. BRUCKNER.